United States Patent [19]
Hoffman et al.

[11] 3,829,786
[45] Aug. 13, 1974

[54] DYNAMIC CONSTRAINT OF A CONTROL SIGNAL

[75] Inventors: Robert E. Hoffman, Erie, Pa.; John A. Cline; Christopher S. Fuselier; John D. D'Atre, all of Pittsfield, Mass.

[73] Assignee: General Electric Company

[22] Filed: Feb. 20, 1973

[21] Appl. No.: 334,118

[52] U.S. Cl. ................ 328/147, 328/154, 328/168
[51] Int. Cl. ........................................... H03k 5/20
[58] Field of Search .......... 328/133, 150, 134, 147, 328/154, 168

[56] References Cited
UNITED STATES PATENTS

| | | | |
|---|---|---|---|
| 3,514,705 | 5/1970 | Feigleson | 328/133 |
| 3,515,997 | 6/1970 | Babany | 328/134 |
| 3,559,178 | 1/1971 | Hibner et al. | 328/150 X |
| 3,588,710 | 6/1971 | Masters | 328/133 |
| 3,644,721 | 2/1972 | Preiser | 328/133 X |

Primary Examiner—John S. Heyman
Attorney, Agent, or Firm—Francis K. Richwine

[57] ABSTRACT

The invention relates to limiting circuits and more particularly to circuits which limit a signal between a minimum and maximum value, wherein the minimum and maximum limits may make dynamic changes. The circuit of this system utilizes electronic comparator and multiplexer circuitry to constrain the output of the circuit to equal the input signal between upper and lower limits. These upper and lower limits may be varied while the circuit is in operation.

6 Claims, 3 Drawing Figures

PATENTED AUG 13 1974          3,829,786

DYNAMIC CONSTRAINT OF A CONTROL SIGNAL

BACKGROUND OF THE INVENTION

1. Field of Invention

The invention relates to a circuit for constraining a signal to fall between dynamically varying upper and lower limit values. More specifically, the limits as utilized by this circuit are allowed to change as a function of time during operation.

It has been found that in some control system operations it is necessary to change operational limits. For example, the need for such a control system occurs in industrial electric motor control for motors which are comprised of stator and rotor assemblies. It is frequently desirable to limit both synchronous frequency and the slip frequency of such motors within prescribed limits. Also, it is desirable to limit the supply voltage to the stator as a function of both synchronous and slip frequency so that airgap flux between stator and rotor of the motor may never exceed the saturation limit of the rotor core. A system such as is contemplated by this invention facilitates these operations and achieves the desired requirements.

2. The Prior Art

The typical limiting circuit encountered in the prior art frequently utilizes DC bias on diodes to control their conduction point and to set conduction limits for the diodes. Other approaches have utilized zener diodes to effect constraint of a signal to fall between levels as defined by the zener breakdown levels. It is apparent that such systems do not allow for dynamically changing the limit levels during the operation of such a limiting circuit. There has thus been a need in the art to provide a simple circuit for maintaining upper and lower limits for a signal which can insure continuity of the output for continuous variation of input signals and variation of maximum and minimum levels for a limiting circuit.

SUMMARY OF THE INVENTION

The invention contemplates a limiting circuit which will constrain an input signal between maximum and minimum values while permitting the limits to be changed. The circuit is based on cascaded electronic comparators and multiplexers. An input signal to be limited is first compared with one limit signal in a comparator-multiplexer combination which produces as an output the closer of the two signals to the second limit. The process is repeated using the first output and the second limit signal. The technique includes the applications of the two signals being compared to both the comparator and to the multiplexer. The comparator determines relative values and keys the multiplexer as to which signal to choose.

DESCRIPTION OF A PREFERRED EMBODIMENT

Figure 1:
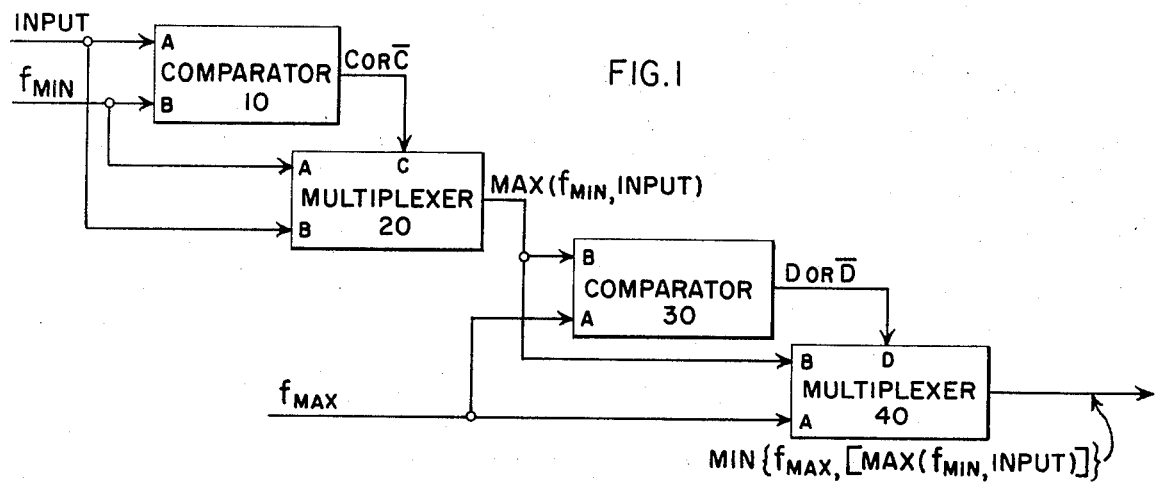
FIG. 1 represents a system using comparators and multiplexers embodying the present invention.

FIG. 1 describes the invention in circuit form. A circuit according to the invention of FIG. 1 produces an output that can take on any of three different values: the input, the maximum ($f_{max}$) or the minimum signal level ($f_{min}$) as shown. This can be expressed mathematically by the equation:

$$\text{output} = \text{minimum}[f_{max}, \text{maximum}(\text{input}, f_{min})]$$

or by the equation:

$$\text{output} = \text{maximum}[f_{min}, \text{minimum}(\text{input}, f_{max})].$$

The maximum and minimum values are shown in the system diagram and are applied to the circuitry, and may be time-varying signals. The system as contemplated utilizes circuitry comprised of comparators and multiplexers of types well known in the art. This circuitry, as will be made clear below, offers the advantages of being fairly simple, and it will insure continuity of the output signal for continuous variation of the input between maximum and minimum levels, which may also time vary.

More specifically, a preferred embodiment of the circuit as shown in FIG. 1 comprises two comparator circuits and two multiplexer circuits. Both the input signal and a minimum level ($f_{min}$) signal are applied to a first comparator 10. This first comparator derives an output binary signal C when the input level is greater than that of the minimum input signal ($f_{min}$). The comparator produces a binary signal $\overline{C}$ which is the inverse of signal C when the input signal remains below the minimum signal ($f_{min}$). Both the minimum level signal ($f_{min}$) and the input signal are also applied to a first multiplexer circuit 20 which also receives an input signal from the output of the above-mentioned first comparator, that is, the signal C or its inverse $\overline{C}$.

The first multiplexer circuit produces an output equal to the input signal to the first comparator when the output signal C of the comparator indicates that the input signal to the first comparator is greater than the minimum signal ($f_{min}$). The first multiplexer produces an output equal to the minimum signal ($f_{min}$) when $\overline{C}$, the inverse of the output of the comparator signal indicates that the input signal to the first comparator is less than the minimum signal ($f_{min}$). Therefore the resultant signal is equal to the maximum signal of the input signal to the first comparator or the minimum signal level ($f_{min}$).

The output of the first multiplexer is applied to the input of the second comparator 30. A second input to the second comparator 30 is a maximum signal level signal ($f_{max}$). The second comparator 30 produces an output binary signal D when the maximum signal exceeds the signal received from the first multiplexer 20 representing the maximum of $f_{min}$ and the input. The comparator 30 produces a binary $\overline{D}$, the inverse of the output D, when the maximum signal ($f_{max}$) is less than the signal received from the first multiplexer.

Both the first multiplexer output signal and the maximum predetermined level signal ($f_{max}$) are applied to a second multiplexer 40 which also received the output of the second comparator 30. The second multiplexer produces a signal equal to the output signal of the first multiplexer when output D produced by the second comparator indicates that the signal from the second multiplexer is less than the maximum predetermined signal level ($f_{max}$). The output of the second multiplexer equals the maximum signal ($f_{max}$) when $\bar{D}$ (the inverse signal mentioned above) produced by the second comparator indicates that the signal received from the first multiplexer exceeds the maximum predetermined signal level. The overall system output is taken from the second multiplexer and can be seen to represent the minimum signal of the signals including the maximum predetermined level signal ($f_{max}$) and the maximum signal of the two signals corresponding to the minimum predetermined level signal ($f_{min}$) and the input signal. That is, output = min[$f_{max}$, max($f_{min}$, input)]. Thus, the input signal level is constrained to fall between the minimum predetermined signal level ($f_{min}$) and the maximum predetermined signal level ($f_{max}$).

The invention may of course be implemented conversely by first determining the minimum of input and the maximum signal level and secondly the maximum of the first output and the minimum signal level, i.e., output = max[$f_{min}$, min($f_{max}$, input)].

It can be seen from the system that the minimum and maximum signal levels can be varied with time over a wide range while the circuit of this invention is allowed to operate. For example, the maximum and minimum reference signals may represent upper and lower limits of applied voltage in industrial electric motor control applications. The applied voltage for certain motor control system may be varied as a function of motor slip frequency and synchronous frequency. As slip frequency and synchronous frequency are varied, applied voltage varies, and it becomes necessary to change the limits for the applied voltage. The system of this invention, because it uses a network of logic devices, allows for these limits to be varied during operation, which is not possible with prior art limiting circuits utilizing non-variable zener diodes or diode biasing schemes.

Figure 2:
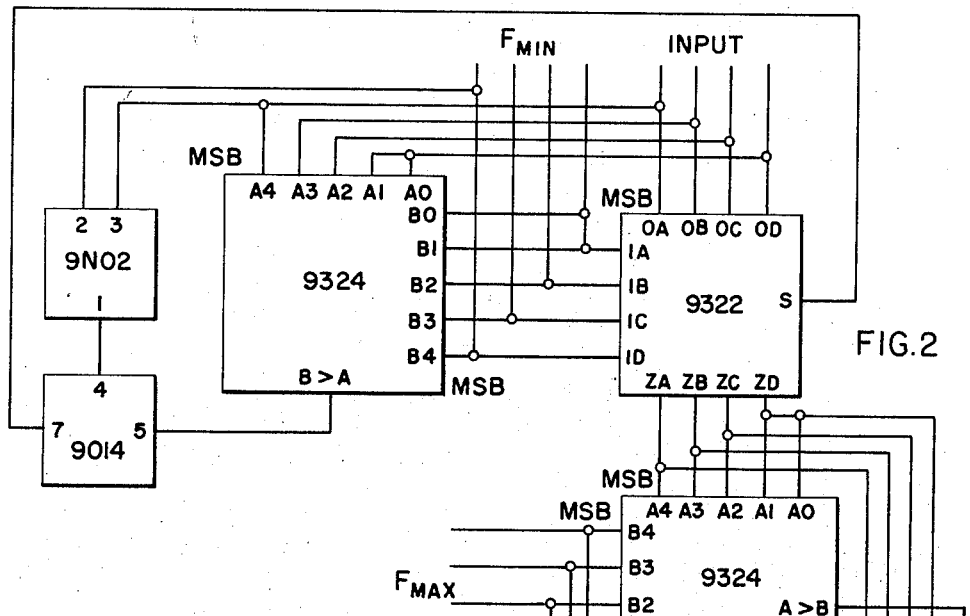
FIG. 2 illustrates an exemplary implementation using commercially available solid state devices.

It should be a matter easily achieved by one skilled in the art to effect circuitry represented here by system diagrams for the comparator and multiplexer circuits. Comparator circuits and multiplexer circuits are well known to those skilled in the art and it would be relatively easy for a system designer to chose from several effective designs of these components which would satisfactorily fulfill the functions required by the system of this invention. One possible implementation is the example illustrated in FIG. 2 wherein Fairchild semiconductor type TTL devices have been used, specifically model 9324 for the comparator circuit and model 9322 for the multiplexer circuits.

Figure 3:
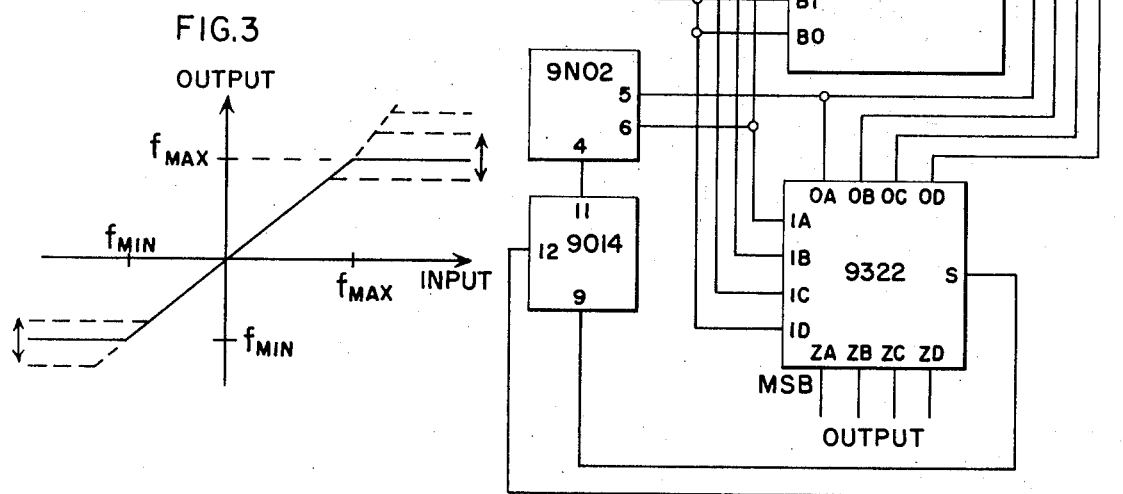
FIG. 3 represents an input/output transfer function graph for a dynamic signal limiter as embodied in the present invention.

Referring now to FIG. 3, there is shown a transfer function of a system of the type contemplated and obtained by the invention. Between the maximum and minimum values shown, $f_{max}$ and $f_{min}$, the output is a linear function of the input, frequently equal to the input. However, when input values meet or exceed either the maximum or minimum values constrained by the circuit, the output will remain at either the applicable maximum or minimum value. In the system contemplated by this invention and accomplished by the circuit described above, both the maximum and minimum values are allowed to be changed while the system is in operation.

Having described and disclosed the system of this invention and an embodiment thereof, the scope of this invention is not limited to the invention of the embodiment described hereinabove and further modifications and applications or variations will occur to those who are skilled in the art. Therefore, such modifications, applications and variations will not depart from the true spirit and scope of this invention as defined in the appended claims.

We claim:
1. A system for constraining an electrical signal to values between variable minimum and maximum limits comprising:
   a. input means for an input signal, a minimum limit signal and a maximum limit signal; and
   b. a first comparator and switching device connected to said input means for receiving said input signal and one of said limit signals, including:
      1 electronic comparator circuitry for receiving said input and one of said limit signals and comparing them according to established criteria and for producing a first switching control signal which indicates the relative magnitudes of said input and one limit signals by assuming one or the other of two discrete values; and
      2. switching circuitry for receiving said input, said one limit and said first switching control signals and for passing one of said input or one limit signal as a first output signal according to preset criteria responsive to the value of said first control signal; and
   c. a second electronic comparator and switching device connected to said input means and cascaded from said first switching circuitry for receiving the other of said limit signals and said first control signal, including:
      1. electronic comparator circuitry for receiving said first output and the other of said limit signals and comparing them according to established criteria and for producing a second switching control signal which indicates the relative magnitude of said first output and other limit signals by assuming one or the other of two discrete values; and
      2. switching circuitry for receiving said first output, said other limit and said second switching control signals and for passing one of said first output or other limit signal as a system output signal according to preset criteria responsive to the value of said second control signal, whereby said input signal can be constrained between limits as set by said minimum and maximum limits.

2. The system of claim 1 wherein said input and limit signals are parallel binary word signals, said first and second comparator and switching devices are digital devices, said comparator circuitries compare signals according to the magnitude of the binary words represented.

3. A system for constraining an electrical signal to values between variable minimum and maximum limits comprising:
   a. input means for an input signal, a minimum limit signal and a maximum limit signal; and
   b. two cascaded sets of a comparator and a switching device connected to said input means;
      1. each comparator comprising circuitry for receiving and comparing an input signal and a limit signal and for producing a control signal indicating the relative magnitude of a selected parameter of said input and limit signals with respect to each other; and 2. each switching device including means for receiving said input signal, said limit signal and said control signal and means responsive to said control signal for producing a constrained signal that is one or the other of said input signal or said limit signal;

wherein the input signal to the comparator of the second set is the constrained signal from the switching device of the first set and the constrained signal from the second set is the system output; and wherein the constrained signal of one set is the greater of its input signal and the minimum limit signal and the constrained signal of the other set is the lesser of its input signal and the maximum limit signal; whereby said system output must be said input signal if it is within said limits or one of said limit signals if said input signal is not within said limits.

4. An electronic system for constraining a binary word to values between first and second binary word limits comprising:
   a. a first comparator for comparing an input binary word signal with a first binary word limit signal and for producing a first binary control signal having one value when said input binary word is greater than said first binary word limit and having a second value when said first binary word limit is greater than said input binary word;
   b. a first multiplexer having input means for receiving said input binary word signal, said first binary word limit signal and said first binary control signal for producing, as a first output signal, said input signal when the input binary word is within said word limits and said first binary word limit signal when the input binary word is not within said word limits as measured by said first binary word limit signal and as controlled by the value of said first binary control signal;
   c. a second comparator for comparing said first output signal with a second binary word limit signal and for producing a second binary control signal having one value when the binary word represented by said first output signal is greater than said second binary word limit and having a second value when said second binary word limit is greater than the binary word represented by said first output signal; and
   d. a second multiplexer having input means for receiving said first output signal, said second binary word limit signal and said second binary control signal for producing, as a second output signal, said first output signal when the binary word represented by said first output signal is within said word limits and said second binary word limit signal when the word represented by said first output signal is not within said word limits as measured by said second binary word limit signal and as controlled by said second binary control signal, whereby said second output signal as the system output is a binary word signal within the values established by said first and second binary word limits.

5. A system for constraining a binary word to values between variable minimum word and maximum word limits comprising:
   a. a first comparator for comparing an input binary word signal with a variable minimum binary word limit signal and for producing a first binary control signal having one value when said input word is greater than said minimum word and having a second value when said minimum word is greater than said input word;
   b. a first multiplexer having input means for receiving said input binary word signal, said minimum limit signal and said first binary control signal for producing, as a first output signal, the one of said input signal or said minimum signal that represents the greater binary word responsive to the value of said first binary control signal;
   c. a second comparator for comparing said first output signal with a variable maximum binary word limit signal and for producing a second binary control signal having one value when the word represented by said first output signal is greater than said maximum word and having a second value when said maximum word is greater than the binary word represented by said first output signal; and
   d. a second multiplexer having means for receiving said first output signal, said maximum limit signal and said second binary control signal for producing, as a second output signal, the one of said first output signal or said maximum limit signal that represents the lesser binary word responsive to the value of said second binary control signal whereby said second output signal is the system output and is a binary word signal representing an input word or a minimum or a maximum limit word by which said input word was constrained.

6. A system for constraining a binary word to values between variable maximum word and minimum word limits comprising:
   a. a first comparator for comparing an input binary word signal with a variable maximum binary word limit signal and for producing a first binary control signal having one value when said input word is greater than said maximum word and having a second value when said maximum word is greater than said input word;
   b. a first multiplexer having means for receiving said input binary word signal, said maximum limit signal and said first control signal for producing as a first output signal the one of said input signal or said maximum signal that represents the lesser binary word, responsive to the value of said first binary control signal;
   c. a second comparator for comparing said first output signal with a variable minimum binary word limit signal and for producing a second binary control signal having one value when the word represented by said first output signal is greater than said minimum word and having a second value when said minimum word is greater than the word represented by said first output signal; and
   d. a second multiplexer having means for receiving said first output signal, said minimum limit signal and said second binary control signal for producing, as a second output signal, the one of said first output signal or said minimum limit signal that represents the greater binary word responsive to the value of said second binary control signal whereby said second output signal is the system output and is a binary word signal representing an input word constrained between the values of a maximum and a minimum limit word.

* * * * *